United States Patent [19]

Misenheimer

[11] 3,785,468
[45] Jan. 15, 1974

[54] DUAL AXIS ROLL AND CONVEYOR SYSTEM USING SAME

[75] Inventor: Reid Misenheimer, Decatur, Ga.

[73] Assignee: Textron Inc., Providence, R.I.

[22] Filed: Mar. 1, 1972

[21] Appl. No.: 230,747

[52] U.S. Cl. .......... 193/35 MD, 29/110, 193/35 SS, 193/36, 193/37, 198/19, 198/127 R
[51] Int. Cl. .............................................. G07f 17/04
[58] Field of Search .......................... 29/110, 129.5; 193/35 R, 35 MD, 35 SS, 35 A, 36, 37; 198/127 R, 19, 192 R, 105; 187/95, 96; 101/DIG. 14

[56] References Cited
UNITED STATES PATENTS

| | | | |
|---|---|---|---|
| 1,464,925 | 8/1923 | Dudley | 198/127 R |
| 2,802,582 | 8/1957 | Isven | 193/37 X |
| 745,340 | 12/1903 | Foley | 101/DIG. 14 |
| 3,563,721 | 2/1971 | Ritter | 198/127 R |
| 3,233,811 | 2/1966 | Wright et al | 227/80 |
| 1,761,199 | 6/1930 | Drake | 193/35 SS X |
| 2,790,527 | 4/1957 | Griffith | 193/35 SS |
| 3,260,335 | 7/1966 | Verreault | 198/127 R X |
| 3,599,769 | 8/1971 | Gardella | 193/37 X |

FOREIGN PATENTS OR APPLICATIONS

| | | | |
|---|---|---|---|
| 101,107 | 2/1965 | Denmark | 193/35 SS |

*Primary Examiner*—Evon C. Blunk
*Assistant Examiner*—W. Scott Carson
*Attorney*—Channing L. Richards et al.

[57] ABSTRACT

A dual axis roll structure is provided that allows relative movement of a roll body axially of a shaft carrying the same while resisting relative rotation of the roll body on the shaft, and that may be employed advantageously in conveyor systems where provision is needed for lateral shifting or manipulation of material to be conveyed, as where the material is to be delivered to or received from a work station at which the work to be performed requires such lateral shifting or manipulation.

14 Claims, 11 Drawing Figures

PATENTED JAN 15 1974 3,785,468

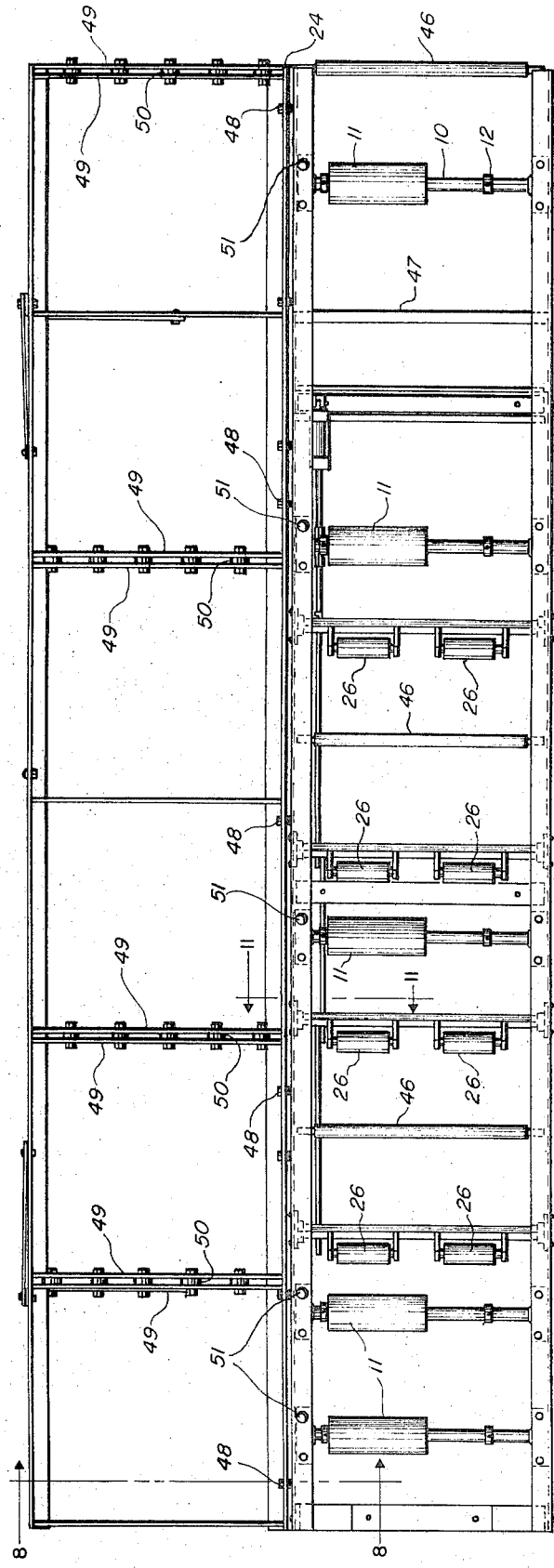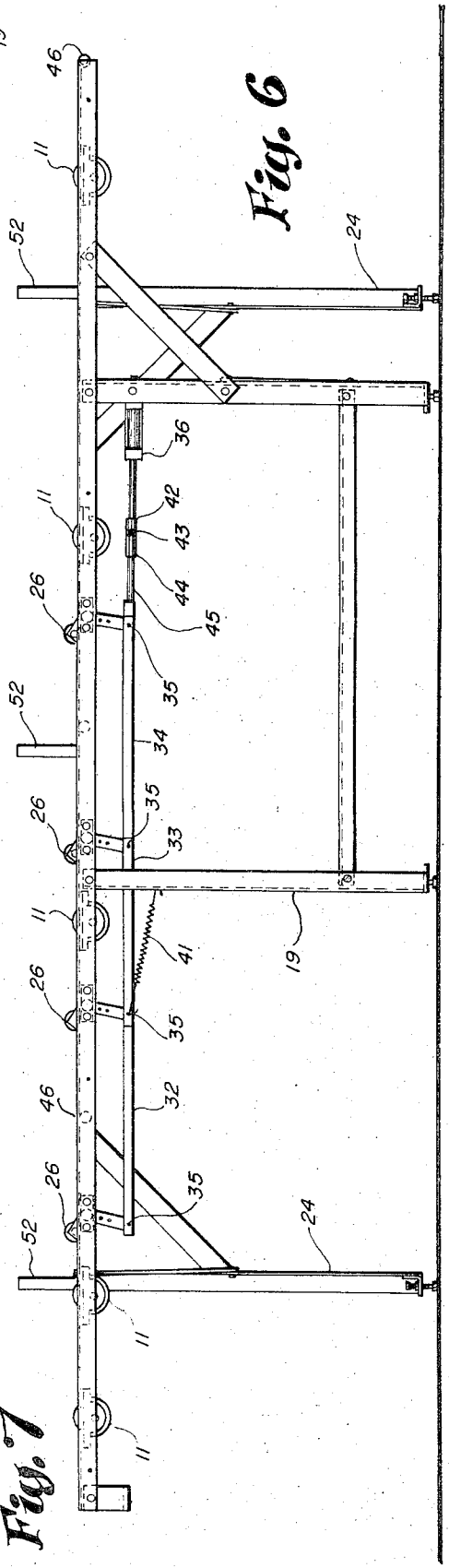

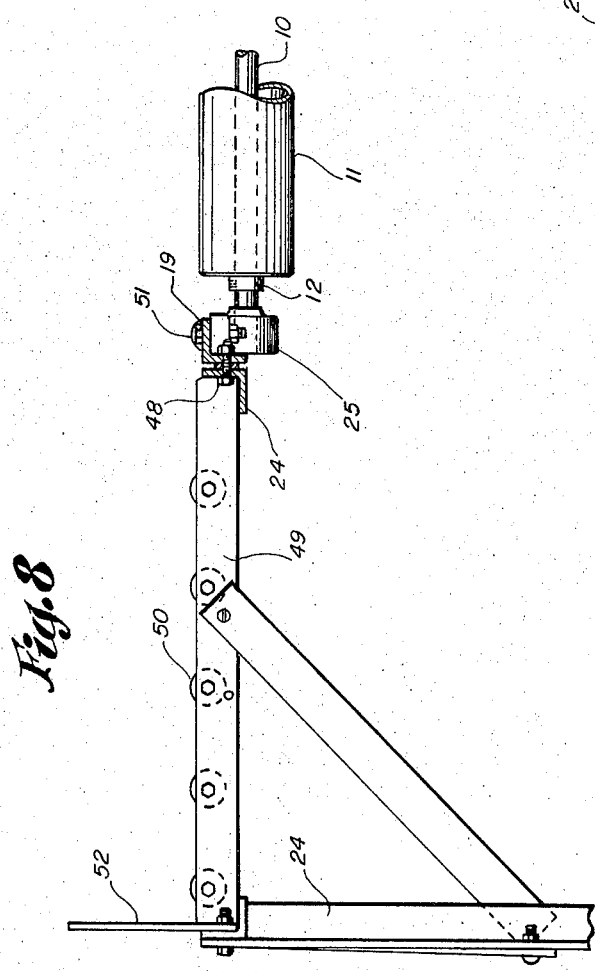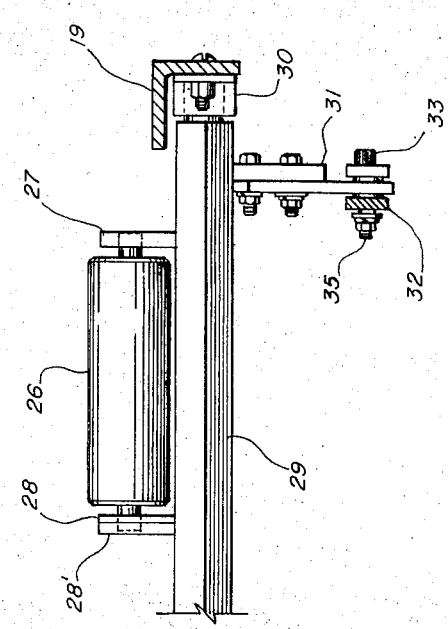

DUAL AXIS ROLL AND CONVEYOR SYSTEM USING SAME

BACKGROUND OF THE INVENTION

It is often desirable to incorporate lateral shifting capability in conveyor systems. U.S. Pats. No. 734,685 and No. 1,123,851 are examples of prior art proposals for providing such capability in feed table conveyors, while U.S. Pats. No. 1,549,499 and No. 1,926,261 disclose proposals for lateral removal of material being conveyed. Because of the relative complication in most prior art proposals of this sort, a much employed alternative consists of a conveyor pattern of balls protruding from housings in which they are held at a fixed location but are free to turn in any direction. Such so-called "ball transfer" devices serve quite well in many instances, but they have the disadvantage of tending to impose a rather bumpy effect on material riding thereover and, more seriously, they are subject to clogging quite easily if the material being handled is such as to shed dirt or particulate waste of any sort. The dual axis roll structure of the present invention avoids these disadvantages very effectively while remaining relatively simple in form.

SUMMARY OF THE INVENTION

Briefly described, the dual axis roll structure provided by the present invention incorporates a roll body that houses means by which it is mounted coaxially on a shaft, and this mounting means is arranged so that it allows relative movement of the roll body axially of the shaft while resisting relative rotation of the roll body on the shaft. As a result, when the roll structure is employed in a conveyor system with the shaft supported for rotation the shaft and roll body act together in normal fashion as a conveyor roll, but with the roll body always free for lateral shifting without disturbing its support of material carried thereon.

The dual axis structure provided in this manner lends itself nicely to any required lateral shifting or manipulation of material being carried thereon or to lateral removal or return of the material being handled, and the invention is described in further detail below in connection with a system employing such dual axis roll structures, and incorporating other features as well, that is adapted particularly for assembling and securing prefabricated housing sub-components, as illustrated in the accompanying drawings.

DESCRIPTION OF THE DRAWINGS

FIG. 6 is an enlarged side elevation of the right-hand counterpart of the FIG. 4 conveyor system;

FIG. 7 is a corresponding plan view;

FIG. 8 is a section detail taken at the line 8—8 in FIG. 7;

FIG. 11 is a further section detail taken at the line 11—11 in FIG. 7.

DETAILED DESCRIPTION OF THE INVENTION

Figure 1:
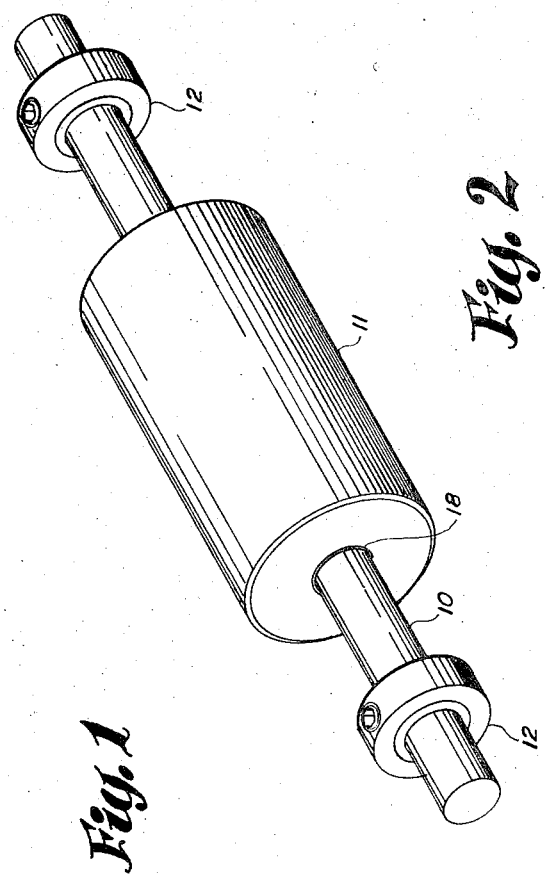
FIG. 1 is a perspective view of a dual axis roll structure embodying the present invention.
Figure 3:
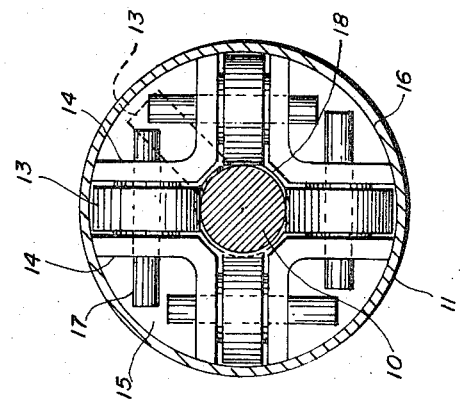
FIG. 3 is a section detail taken at the line 3—3 in FIG. 2.
Figure 2:
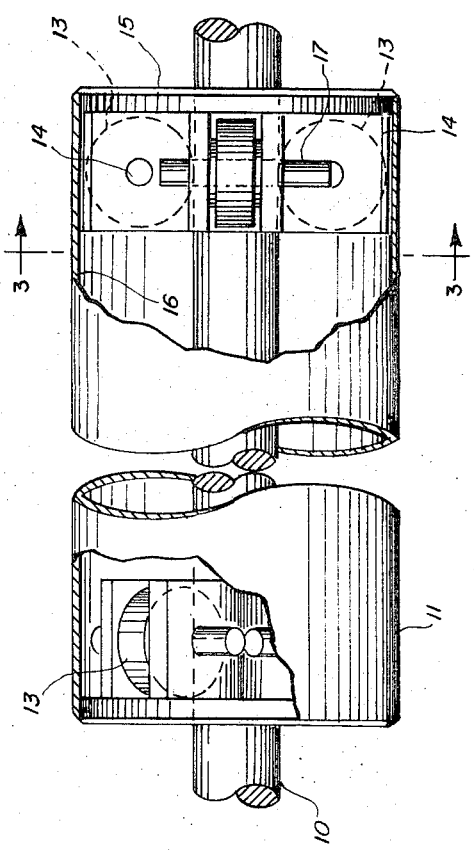
FIG. 2 is a side elevation of the FIG. 1 roll structure.

FIGS. 1, 2 and 3 illustrate the arrangement of a dual axis roll structure per se in accordance with the present invention. As seen in FIG. 1, the roll structure basically includes a shaft 10, a roll body 11 mounted thereon, and set collars 12 that may be posited on the shaft 10 to regulate the extent of lateral shifting allowed for the roll body 12.

The manner in which the roll body 12 is mounted on the shaft 10 is shown in FIGS. 2 and 3 to comprise roller bearings 13 supported adjacent each roll body end on axes transverse to that of shaft 10 and riding symmetrically thereon. At least three roller bearings 13, and preferably four as shown, are provided at each roll body end, and the bearings 13 at one end are disposed out of alignment with those at the other by half the angular spacing between the bearings. That is, with four bearings 13 at each end as illustrated, the symmetrical arrangement spaces the bearings 90° apart and the bearings at the respective ends are disposed 45° out of alignment or phase.

The reason for phasing the bearings 13 in this manner is to maximize resistance to relative rotation of roll body 11 on shaft 10. Because each roller bearing 13 essentially makes only point contact with shaft 10 in the illustrated arrangement, such relative rotation could occur unless it is provided against, and if it did occur the likely result would be an objectionable scoring of the shaft 10. This result could be prevented in other ways, as by flating the shaft 10 for line contact with roller bearings 13, and some arrangement of this sort might be desirable if the loads to be dealt with required more bearing contact with shaft 10, but the illustrated phasing arrangement is quite effective and much simpler and any needed greater bearing contact can be obtained by forming the riding faces of bearings 13 concavely.

Support for the roller bearings 13 is arranged between mounting brackets 14 of right angular form that are welded to end plates 15 which are in turn secured by fillet welding at the ends of a tubular shell 16 to form the roll body 11. The mounting brackets 14 are paired so that adjacent legs are spaced in parallel relation to accommodate a roller bearing 13 therebetween and to receive a transverse axis pin 17 for each bearing 13. These axis pins 17 are proportioned in length and staggered in arrangement, as seen in FIG. 3 so that they require no securing of any sort to remain in place for carrying the roller bearings 13. The roll body 11 thus forms a housing for the means by which it is mounted for lateral shifting on the shaft 10, and it should be further noted that the roll body end plates 15 have central apertures 18 through which the shaft 10 extends at a close clearance (e.g., about 0.015 inches on a side with respect to a 1 inch shaft 10) so that as the roll body 11 is shifted laterally these end plates 15 serve to strip the shaft 10 quite effectively of any debris thereon and maintain it clear throughout the extent of roll body shifting.

Figure 5:
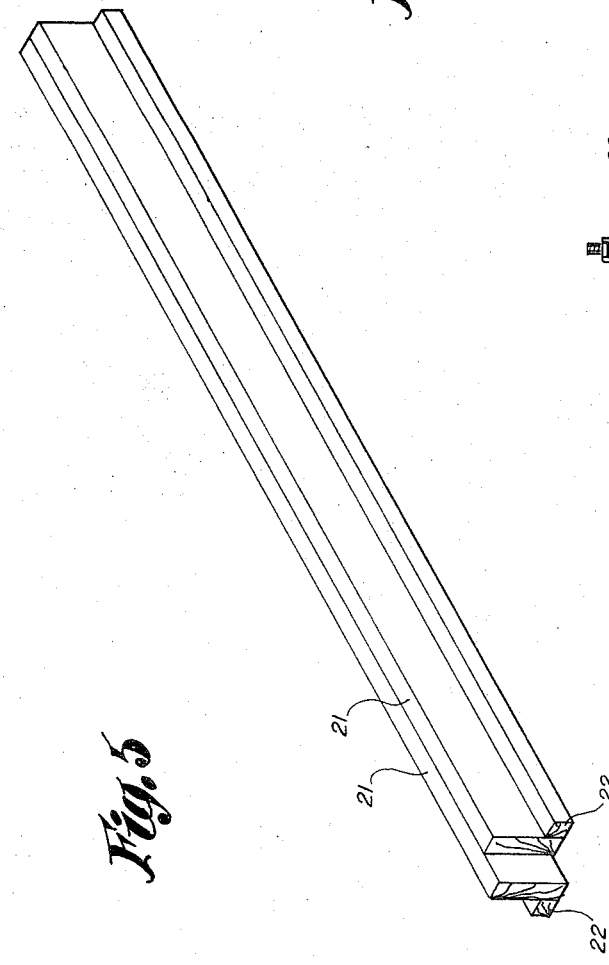
FIG. 5 is a perspective view of a representative housing sub-component such as the FIG. 4 system is adapted to handle.
Figure 4:
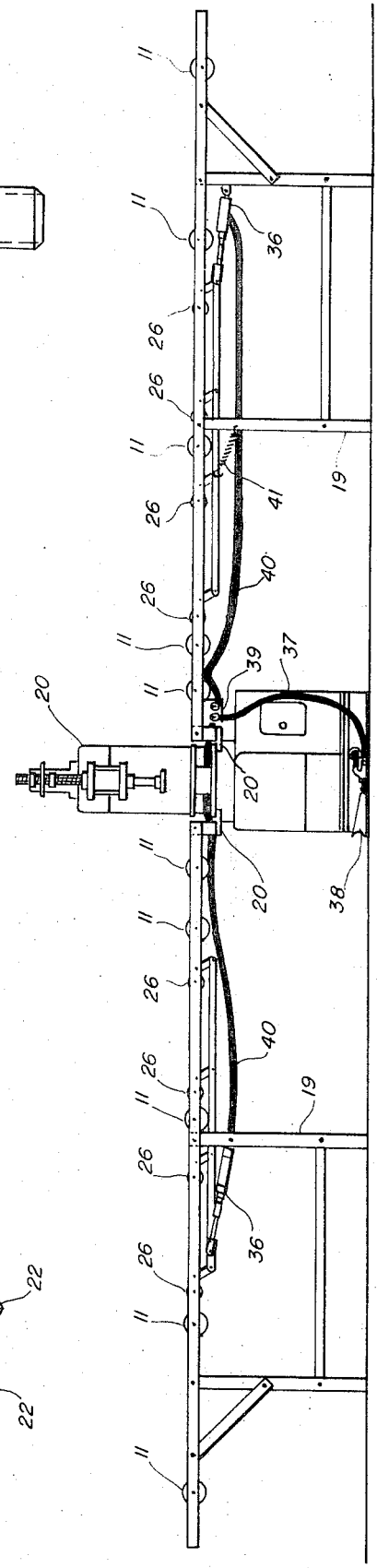
FIG. 4 is a side elevation indicating the general arrangement of a conveyor system employing dual axis roll structures in accordance with the present invention and adapted for use in counterpart form at each side of a fastener forming and inserting machine for assembling and securing the previously mentioned housing sub-components.

Use of dual axis roll structures of the foregoing sort in a conveyor system is exemplified by the illustration in FIG. 4 in which frame structures 19 carrying dual axis rolls 11 at five indicated positions are arranged at each side of a fastener forming and inserting machine 20 for handling work thereat. The fastener forming and inserting machine 20 is of the type disclosed in U.S. Pat. No. 3,233,811 as being adapted for nailing heavy-duty assemblies, such as the previously mentioned housing sub-components, a representative example of which is illustrated in FIG. 5 to consist of two 2 inch × 8 inch members 21 secured in face to face relation and having 2 inch × 2 inch ledger pieces 22 attached at each side thereof to form a girder component at which joists are to be supported.

The frame structures 19 for the conveyor units provided at each side of the fastener forming and inserting machine 20 for handling such components are held in position thereat by tie plates as at 23 in FIG. 4, and as the respective conveyor units are substantial counterparts the right-hand unit seen in FIG. 4 is shown on an enlarged scale in FIGS. 6 and 7 for reference in describing their arrangement further.

As shown in FIGS. 6 and 7, each conveyor unit includes a secondary frame structure 24 arranged for transfer storage as will be described in detail presently. Dealing first with the primary frame structure 19, it carries the dual axis rolls 11 at pillow blocks 25 in which the ends of the related shafts 10 are received and supported for rotation (see FIG. 8 as well as 6 and 7). In addition, the frame structure 19 carries a plurality of axially aligned and spaced roll pairs 26, which are also indicated in FIG. 4.

These roll pairs 26 are provided for use when odd shapes must be handled, as when the ledger pieces 22 are being attached in forming the FIG. 5 girder component, and for this purpose they are carried on the frame structure 19 for elevation above and retraction below the level of the dual axis rolls 11. In particular, the roll pairs 26 are rotatably mounted in spaced arms 27 and 28 that extend from square shafts 29 having rounded end portions supported in pillow blocks 30 carried by the frame structure 19 (compare FIGS. 7 and 11).

The square shafts 29 also have bell crank arms 31 extending therefrom adjacent one end and between which connecting links 32, 33 and 34 are arranged on pivot bolts 35 (see FIG. 11). One of these connecting links or one of the bell crank arms 31 (compare FIGS. 4 and 6) also has a fluid-actuated power cylinder 36 pivotally connected thereat from a pivotal mounting on the frame structure 19. The power cylinders 36 are operated from an air line 37 tapped off the supply to the machine 20 adjacent its actuating pedal 38 and running to switch controls supplied in series at 39 so that either or both of the cylinders 36 may be actuated selectively through separate continuing lines 40 running thereto. Upon opening the air supply to either cylinder 36 at the switch control 39 the arrangement is such as to extend the cylinder piston rod for elevating the roll pairs 26, while a tension spring 41 anchored on frame structure 19 is provided for retracting the roll pairs 26 when the air supply is cut off at the switch control 39.

In order to provide for adjustably setting both the elevated and retracted positions of the roll pairs 26, the cylinder piston rods are fitted with a floating limit sleeve 42, a jam nut 43, and a threaded coupler 44 from which an operating link 45 extends for pivot connection at one of the bell crank arms 31 or a connecting link running therebetween. The result of this arrangement is to allow the coupler 44 and jam nut 43 to be set on a threaded end portion (not shown) of the cylinder piston rod so as to bottom on the limit sleeve 42 for determining a desired retracted position of the roll pairs 26, while an adjacent threaded portion (not shown) of the operating link 45 may then be adjusted in the coupler 44 before connection with the bell crank arm 31 to determine the elevated roll pair position.

It should be additionally mentioned that the frame structure also carries several further live rolls 46, one of which is positioned at the remote end of the frame structure so that it is available to ease the handling of any work that may be conveniently placed at this frame structure end with one end of the work resting on the ground until the time comes for drawing it into place for feeding to the machine 20. The other live rolls 46 are spaced along the frame structure 19 to avoid leaving any unduly wide open space and to facilitate feeding of relatively short work lengths. These further live rolls 46 suitably consist simply of sleeves fitted with bushings at each end and mounted on fixed rods that are fixed in place as frame structure tie rods. The live rolls 46 should be arranged at a level corresponding approximately with that of the roll pairs 26 in retracted position, and whenever a live roll is not considered necessary the rod on which it would be mounted may be used alone as a tie rod as at 47 in FIG. 7.

Figure 10:
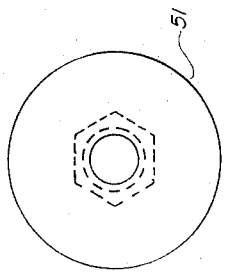
FIG. 10 is a top plan view corresponding to FIG. 9.
Figure 9:
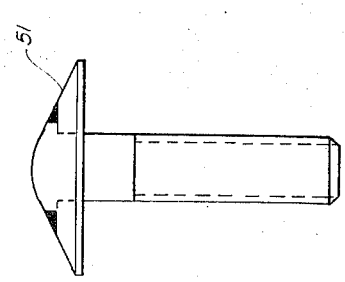
FIG. 9 is an elevation detail of a bumper knob as seen in FIG. 8.

The previously mentioned secondary frame structure 24 that is arranged for transfer storage is bolted to the primary frame structure 19 at spaced points along its length in the manner illustrated best at 48 in FIG. 8. Storage transfer is provided for thereon at a plurality of lateral slideways formed by pairs of relatively closely spaced cross bars 49 between which a series of spaced rollers 50, suitably roller bearing units, are mounted substantially at the level of the dual axis roll bodies 11 (compare FIGS. 7 and 8). In addition, at the adjacent side of frame structure 19 one of the bolts 51 provided to secure each of the pillow blocks 25 supporting the dual axis roll shaft 10 is specially formed, as shown in FIGS. 9 and 10, to facilitate transfer to the storage section or return therefrom.

The special bolts 51 are formed by welding a washer of suitable thickness in place beneath the head of a standard machine bolt and then machining the top face of the bolt head and washer to the illustrated knob shape having a central height sufficient to extend slightly above the level of the slideway rollers 50 and the dual axis rolls 11. The result is to provide spaced knobs of enough elevation to reduce materially the drag imposed on a workpiece being transferred thereover and additionally to ease the transfer movement onto or off of the slideway rollers 50 and the dual axis rolls 11. At the backside of secondary frame structure 24 a suitable number of uprights 52 are provided to serve as backstops for collecting groups of workpieces on the storage section.

Typical operating procedure in handling the workpieces needed for assembling a girder component of the sort illustrated in FIG. 5 is commenced by placing girder members 21 of the required size and length on the dual axis rolls 11 of the left-hand conveyor unit for feeding to the fastener forming and inserting machine 20 after setting the machine for the proper fastener length and arranging work guides thereat for handling these particular pieces in a manner comparable to that described in the previously noted U.S. Pat. No. 3,233,811.

The work guide arrangement is made to align the girder members 21 initially with any lengthwise offset needed for subsequent jointing with other girder components, and the girder members 21 are then fastened securely together as they are fed through the machine 20. Securing of the girder members 21 at this stage is done best by staggering the inserted fasteners alternately towards the top and bottom girder edges, and the dual axis rolls 11 allow the lateral shifting necessary for this purpose to take place smoothly and rapidly during the feeding.

The secured girder members 21 are received on the dual axis rolls 11 of the right-hand conveyor unit which likewise accommodate the lateral shifting that continues until the securing is completed. If, as is usually the case, a series of similar girder components are needed, the dual axis rolls 11 are further utilized in transferring each secured pair of girder members 21 to the right-hand storage section arranged on the secondary frame structure 24 until securing of the last pair of the series has been completed. Also, if necessary, two or three of the secured girder pairs can be set off over the remote live roll 46 with one end resting on the ground until ready for the next operation, so that the storage section usually does not have to be made any larger than is needed for a component series of average number.

Having secured all of the girder members 21 of the series being handled, the fastener length is reset at the machine 20 and work guides are rearranged thereat for attaching the ledger pieces 22. Then the last secured pair of girder members 21 still resting on the dual axis rolls 11 of the right-hand conveyor unit is shifted laterally over the front rolls of the roll pairs 26 and these roll pairs are elevated at both the right-and left-hand conveyor units. The extent of elevation will have been previously set so that a ledger piece 22 may be inserted between the inner support arms 28 for the rolls 26 to ride on the dual axis rolls 11 while the secured girder members 21 are supported by the rolls 26 level with the top face of the inserted ledger piece 22.

In this connection it should be noted that the roll pairs 26 are arranged in both the right- and left-hand conveyor units so that their support arms 27 and 28 pivot toward the right for elevation, and so that these support arms are inclined toward the left when elevated. In addition, the exposed edges of the inner support arms 28 are beveled as indicated at 28' in FIG. 11, so that a ledger piece 22 is easily inserted therebetween and easily received in the same relation as the left-hand conveyor unit following attachment.

As the elevated girder member 21 and inserted ledger piece 22 are fed through the machine 20, the work guide arrangement aligns these elements properly for attachment of the latter and the full series being handled is put through this operation in similar fashion using the left-hand storage section this time to accumulate the work as each ledger piece 22 is attached, the transfer to the storage section being accomplished by lowering the left-hand roll pairs 26 and turning each work unit over so that the attached ledger piece 22 is up of the transfer.

Then, finally, the work guide arrangement at the machine 20 is readjusted for attachment of the opposite ledger piece 22, and while this is being done the work units accumulated at the left-hand storage section are carried to the right-hand one, and when everything is ready the units are successively transferred onto the dual axis rolls 11 of the right-hand conveyor unit and aligned over the back rolls of the roll pairs 26 which are then elevated to allow insertion of the other ledger piece 22 in opposing relation and the attaching operation is repeated to complete the units in a form comparable to that of the FIG. 5 component.

It will be apparent that dual axis rolls embodying the present invention might be used to comparable advantage in relation to any other sort of work station requiring lateral shifting of work being fed therethrough, or whenever lateral shifting is required during material conveying for any purpose, and the invention has accordingly been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. A roll structure comprising a regularly shaped shaft, a tubular roll body, and roller bearing mounting means arranged on axes transverse to that of said shaft and roll body and housed within said roll body adjacent the ends thereof and interposed between the same and said shaft, said mounting means having the rolls thereof riding said shaft and acting to dispose said roll body coaxially on said shaft, to provide for relative movement of said roll body axially of said shaft, and to resist relative rotation of said roll body on said shaft.

2. A roll structure as defined in claim 1 wherein said shaft and roll body have continuous cylindrical surfaces.

3. A roll structure as defined in claim 1 wherein said mounting means comprises at least three roller bearings supported adjacent each end of said roll body on axes transverse to that of said shaft and roll body, said roller bearings riding said shaft symmetrically at each roll body end and the bearings at one roll body end being disposed out of alignment with those at the other end by half the angular spacing between said bearings.

4. A roll structure as defined in claim 3 wherein four roller bearings are supported adjacent each roll body end.

5. A roll structure as defined in claim 3 wherein said roller bearings ride said shaft at cylindrical faces so as to make essentially point contact therewith.

6. A roll structure as defined in claim 3 wherein said roll body is formed by a tubular shell fitted with end plates on which said roller bearings are supported.

7. A conveyor system comprising a frame structure, a plurality of horizontally disposed and regularly shaped shafts carried in level succession on said frame structure for rotation, a corresponding plurality of tubular roll bodies, and roller bearing mounting means arranged on axes transverse to that of said shafts and roll bodies and housed within each of said roll bodies adjacent the ends thereof and interposed between the same and said shafts, said mounting means having the rolls thereof riding said shafts and acting to dispose said roll bodies coaxially on said shafts, to provide for relative movement of said roll bodies axially of said shafts, and to resist relative rotation of said roll bodies on said shafts.

8. A conveyor system as defined in claim 7 wherein a plurality of axially aligned and spaced roll pairs are additionally carried on said frame structure for elevation above and retraction below the level of said roll bodies together with setable means for actuating elevation and retraction of said roll pairs.

9. A conveyor system as defined in claim 8 wherein said setable actuating means comprises bell crank structures carrying each of said roll pairs on said frame structure, a link connecting all of said bell crank structures for operation together, and a fluid-actuated power cylinder mounted on said frame structure and having the piston rod thereof connected to translate said link, the connection between said piston rod and link including a coupler adjustable on said piston rod to set the retraction rach thereof and an extension rod adjustable in said coupler and connectable with said link to set the extension reach of said piston rod.

10. A conveyor system as defined in claim 8 wherein a secondary frame structure is secured to said first frame structure in contiguous parallel reaction, a plurality of lateral slideways are carried on said secondary frame structure substantially at the level of the roll bodies on said first frame structure, and stationary knobs extending slightly above the level of said slideways and roll bodies are fixed on said first frame structure adjacent said secondary one.

11. A conveyor system as defined in claim 10 wherein said slideways are formed by spaced bars reaching across said secondary frame structure and having a series of spaced rollers mounted therebetween on axes extending transversely with respect to the axes of the shafts carrying said roll bodies.

12. A conveyor system as defined in claim 10 wherein said stationary knobs are formed by specially shaped heads of bolts securing bearings for the shafts on which said roll bodies are carried.

13. A conveyor system as defined in claim 7 sidposed at each side of a work station for delivery of work to said station from the roll bodies of the conveyor system at one side thereof and for receiving work from said station on the roll bodies of the conveyor system at the other side thereof.

14. A conveyor system as defined in claim 13 and further characterized in that said work station is a fastener forming and inserting machine.

* * * * *

PO-1050
(5/69)

UNITED STATES PATENT OFFICE
CERTIFICATE OF CORRECTION

Patent No. 3,785,468    Dated January 15, 1974

Inventor(s) Reid Misenheimer

It is certified that error appears in the above-identified patent and that said Letters Patent are hereby corrected as shown below:

Column 7, line 18, "rach" should read -- reach --; line 23, "reaction" should read -- relation --. Column 8, line 15, "sidposed" should read -- disposed --.

Signed and sealed this 3rd day of September 1974.

(SEAL)
Attest:

McCOY M. GIBSON, JR.          C. MARSHALL DANN
Attesting Officer              Commissioner of Patents